US005697443A

United States Patent [19]
Brezinski et al.

[11] Patent Number: 5,697,443
[45] Date of Patent: Dec. 16, 1997

[54] METHOD AND COMPOSITION FOR ACIDIZING SUBTERRANEAN FORMATIONS UTILIZING CORROSION INHIBITOR INTENSIFIERS

[75] Inventors: Michael M. Brezinski; Bhadra Desai, both of Duncan, Okla.

[73] Assignee: Halliburton Energy Services, Inc., Duncan, Okla.

[21] Appl. No.: 599,201

[22] Filed: Feb. 9, 1996

[51] Int. Cl.⁶ .................................................. E21B 43/27
[52] U.S. Cl. ................................... 166/307; 166/920
[58] Field of Search .......................... 166/307, 271, 166/902, 300

[56] References Cited

U.S. PATENT DOCUMENTS

| | | |
|---|---|---|
| 3,077,454 | 2/1963 | Monroe et al. . |
| 3,773,465 | 11/1973 | Keeney et al. . |
| 4,498,997 | 2/1985 | Walker . |
| 4,670,163 | 6/1987 | Lindstrom et al. . |
| 4,698,168 | 10/1987 | Briggs . |
| 4,734,259 | 3/1988 | Frenier et al. . |
| 4,790,958 | 12/1988 | Teot ............................... 166/307 |
| 4,997,040 | 3/1991 | Cizek ............................. 166/307 |
| 5,089,153 | 2/1992 | Williams et al. ............... 166/307 X |
| 5,120,471 | 6/1992 | Jasinski et al. . |
| 5,366,643 | 11/1994 | Walker . |
| 5,411,670 | 5/1995 | Walker . |
| 5,441,929 | 8/1995 | Walker . |

*Primary Examiner*—William P. Neuder
*Attorney, Agent, or Firm*—Robert A. Kent

[57] ABSTRACT

The present invention provides a corrosion inhibitor intensifier for acidizing solutions for use in subterranean formation treatments wherein the corrosion inhibitor comprises a quaternary ammonium compound. The intensifier comprises an effective amount of a source of iodide ions and a source of formic acid.

15 Claims, No Drawings

METHOD AND COMPOSITION FOR ACIDIZING SUBTERRANEAN FORMATIONS UTILIZING CORROSION INHIBITOR INTENSIFIERS

BACKGROUND OF THE INVENTION

1. Field of the Invention

The present invention relates to a method of acidizing a subterranean formation or wellbore employing an acidic solution containing a corrosion inhibitor and an intensifier which substantially reduces the corrosive effects of the acidic solution on ferrous and other metals in contact with the acidic solution.

2. Prior Art

Acidizing and fracturing treatments using aqueous acidic solutions commonly are carried out in hydrocarbon-containing subterranean formations penetrated by a wellbore to accomplish a number of purposes, one of which is to increase the permeability of the formation. The increase in formation permeability normally results in an increase in the recovery of hydrocarbons from the formation.

In acidizing treatments, aqueous acidic solutions are introduced into the subterranean formation under pressure so that the acidic solution flows into the pore spaces of the formation. The acidic solution reacts with acid-soluble materials contained in the formation which results in an increase in the size of the pore spaces and an increase in the permeability of the formation.

In fracture-acidizing treatments, one or more fractures are produced in the formation and the acidic solution is introduced into the fracture to etch flow channels in the fracture face. The acid also enlarges the pore spaces in the fracture face and in the formation.

The rate at which acidizing fluids react with reactive materials in the subterranean formation is a function of various factors including but not limited to acid concentration, temperature, fluid velocity and the type of reactive material encountered. Whatever the rate of reaction of the acidic solution, the solution can be introduced into the formation only a certain distance before it becomes spent. It is desirable to maintain the acidic solution in a reactive condition for as long a period of time as possible to maximize the permeability enhancement produced by the acidic solution.

A problem associated with acidizing subterranean formations is the corrosion by the acidic solution of the tubular goods in the wellbore and the other equipment used to carry out the treatment. The expense of repairing or replacing corrosion damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation. The partial neutralization of the acid results in the production of quantities of metal ions which are highly undesirable in the subterranean formation.

Various methods have been proposed to decrease the corrosion problem related to acidizing treatments.

U.S. Pat. No. 3,773,465 presents a typical teaching with respect to treatment of a low alloy, or N-80-type production conduits with intensified acid corrosion inhibitor compositions, and discloses the use of cuprous iodide in such treatment. Halohydroxyalkylthio-substituted and dihydroxyalkylthio-substituted polycarboxylic acids and alkali metal salts thereof are taught as effective corrosion inhibitors for various metal surfaces in U.S. Pat. No. 4,670,163. In one embodiment, mineral acid compositions such as aqueous hydrochloric acid metal cleaning solutions exhibit diminished corrosiveness when corrosion inhibiting additives of the invention are present in the compositions.

U.S. Pat. No. 4,498,997 relates to a method of acidizing a subterranean formation or wellbore employing an acidic solution containing a corrosion inhibitor composition having an inhibiting effective amount of an acetylenic alcohol, a quaternary ammonium compound, an aromatic hydrocarbon and an antimony compound intensifier.

U.S. Pat. No. 4,734,259 relates to a method for inhibiting attack of aqueous corrosive fluids on metal by utilizing a corrosion inhibitor including an α, β-unsaturated aldehyde and a surfactant.

U.S. Pat. No. 4,997,040 relates to an acid soluble mercury salt intensifier for use with a corrosion inhibitor. An acid soluble copper metal salt may also be present as a co-intensifier.

U.S. Pat. No. 5,120,471 relates to a corrosion inhibitor composition utilizing an organic inhibitor and an acid soluble antimony or bismuth compound.

U.S. Pat. Nos. 5,366,643 and 5,411,670 relate to corrosion inhibiting compositions utilizing a source of antimony ions to increase the effectiveness of the composition.

U.S. Pat. No. 5,441,929 relates to a method of protecting both ferrous based alloys and titanium alloys from attack by hydrochloric acid utilizing an effective amount of a first inhibitor component including at least one reducing compound and a second inhibitor component including a source of molybdate ions. It would be desirable to provide a composition and method for acid treating a subterranean formation which does not utilize heavy metal salts.

SUMMARY OF THE INVENTION

The present invention relates to a method and composition for acidizing subterranean formations utilizing a surprisingly effective corrosion inhibitor intensifier. The corrosion inhibitor is a composition comprising at least a quaternary ammonium compound and the corrosion inhibitor intensifier comprises two essential ingredients: a source of iodide ions and a source of formic acid. The source of iodide ions may be an iodide salt such as potassium iodide, copper iodide, molecular iodide or the like and the source of formic acid may be formic acid or any precursor that produces formic acid in an acidic solution. The quaternary ammonium compound of the inhibitor comprises a compound of the general formula

wherein the R's represent the same or different long chain alkyl, cycloalkyl, aryl or heterocyclic groups and X represents an anion. The corrosion inhibitor also may include other ingredients such as acetylenic alcohols, anionic or nonionic surfactants, selected reaction products having corrosion inhibiting properties, alkanols and the like.

DESCRIPTION OF THE PREFERRED EMBODIMENT

In accordance with the present invention there is provided an aqueous acidic solution comprising an aqueous fluid, an acid, a corrosion inhibitor including a quaternary ammonium compound and a corrosion inhibitor intensifier comprising a source of iodide ions and a source of formic acid which are present in an amount effective to enhance the corrosion inhibition of the corrosion inhibitor.

The acid employed in the aqueous acidic solution of the present invention may comprise hydrochloric acid, hydrofluoric acid, acetic acid, mixtures of these acids and the like. The present invention is particularly effective with hydrochloric acid having a concentration in the aqueous fluid of about 15% or more when used at temperatures above about 200° F.

The aqueous fluid may comprise substantially any aqueous fluid that does not adversely react with the corrosion inhibitor or intensifier. The fluid can comprise fresh water, brine, salt-containing solutions such as sodium chloride solutions, potassium chloride solutions or ammonium chloride solutions, brackish water or the like.

The corrosion inhibitor comprises a composition including a quaternary ammonium compound of the general formula $(R)_4 N^+ X^-$ wherein the R's represent the same or different long chain alkyl, cycloalkyl, aryl or heterocyclic groups and X represents an anion such as for example a halide. Examples of such compounds include N-alkyl, N-cycloalkyl and N-alkylaryl pyridinium halides such as N-cyclohexylpyridinium bromide N-octylpyridinium bromide, N-nonylpyridinium bromide, N-decylpyridinium bromide, N-dodecylpyridinium bromide, N,N-didodecyldipyridinium dibromide, N-tetradecylpyridinium bromide, N-laurylpyridinium chloride, N-dodecylbenzylpyridinium chloride, N-dodecylquinolinium bromide, N-(1-methylnapthyl) quinolinium chloride, N-benzyl)quinolinium chloride and the like. Other quaternary ammonium compounds include monochloromethylated and bischloromethylated pyridinium halides, ethoxylated and propoxylated quaternary ammonium compounds, sulfated ethoxylates of alkyl phenols and primary and secondary fatty alcohols, didodecyldimethylammonium chloride, hexadecylethyldimethylammonium chloride, 2-hydroxy-3-(2-undecylamidoethylamino)-propane-1-triethylammonium hydroxide, 2-hydroxy-3-(2-heptadecylamidoethylamino)-propane-1-triethylammonium hydroxide, 2-hydroxy-3-(2-heptadecylamidoethylamino)-propane-1-triethylammonium hydroxide, and the like.

The corrosion inhibitor also may include unsaturated carbonyl compounds, unsaturated ether compounds, unsaturated alcohols, condensation products formed by reacting an aldehyde in the presence of a carbonyl compound, and condensation products formed by reaching an aldehyde in the presence of a carbonyl compound and a nitrogen containing compound and a carbonyl compound.

Examples of unsaturated carbonyl compounds include 1-phenyl-1-ene-3-butanone and cinnamaldehyde.

An example of unsaturated ether compound is 1-phenyl-3-methoxy-1-propene.

Examples of unsaturated alcohols include acetylenic alcohols. Acetylenic alcohols that can be used include acetylenic compounds having the general formula:

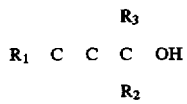

wherein $R_1$, $R_2$ and $R_3$ are hydrogen, alkyl, phenyl, substituted phenyl or hydroxy-alkyl radicals. Preferably, $R_1$ comprises a hydrogen radical. Preferably, $R_2$ comprises a hydrogen, methyl, ethyl or propyl radical. Preferably, $R_3$ comprises an alkyl radical having the general formula $C_n H_{2n}$ where n is an integer from 1 to 10. Specific examples include methyl butynol, methyl pentynol, hexynol, ethyl octynol, propargyl alcohol, benzylbutynol, ethynycyclohexanol and the like. Preferred alcohols are hexynol, propargyl alcohol, methyl butynol and ethyl octynol.

Examples of suitable condensation products formed by reacting an aldehyde in the presence of a nitrogen containing compound and a carbonyl compound are described in U.S. Pat. No. 3,077,454 to Monroe et al. which is incorporated by reference herein. When a condensation product is used, the quaternary ammonium compound of the corrosion inhibitor may comprise a portion of the condensation product.

The corrosion inhibitor is present in an amount effective to inhibit corrosion by the aqueous acid solution on the ferrous surfaces to be protected. Generally the corrosion inhibitor will be present in an amount of from about 0.05 to about 2% by weight based upon the weight of the aqueous acid solution.

The corrosion inhibitor intensifier comprises an effective amount of two essential ingredients comprising a source of iodide ions and a source of formic acid. The iodide ion concentration necessary to effect intensification of the corrosion inhibiting effect of the corrosion inhibitor is in the range of from about 5 to in excess of 100 lb/thousand gallons of treating fluid. The iodide ions can be provided by any aqueous or acid soluble source of iodide such as for example copper iodide, potassium iodide, sodium iodide and the like. The iodide also may result from molecular iodine. The formic acid concentration necessary in combination with the iodide to effect intensification of the corrosion inhibitor is in the range of from about 0.5% to in excess of about 8% by volume. The formic acid may be provided directly as formic acid or any precursor capable of producing formic acid in the acidic solution may be utilized such as for example sodium formate, potassium formate or esters such as methylformate and the like.

Surprisingly it has been found that the iodide ion and formic acid synergistically interact with the corrosion inhibitor containing a quaternary ammonium compound to intensify the effectiveness of the inhibitor over either constituent alone or the pure additive effects of the constituents. Such intensifying effect is not seen in the absence of a quaternary ammonium compound in the corrosion inhibitor.

In addition, solvents, surfactants (e.g., dispersing agents) and other components commonly used in acidizing compositions as known to those skilled in the art can be included in the inventive acidizing composition to broaden the utility of the composition, enhance the effectiveness of the composition and/or facilitate the use thereof provided such optional components do not substantially interfere with the performance of the remaining components of the composition.

For example, a solvent such as an alkyl alcohol, glycol or mixture thereof can be employed in the inventive acidizing composition to assist in maintaining the various components of the composition as a homogenous mixture. Examples of alkyl alcohols and glycols that can be used include methyl alcohol, ethyl alcohol, propyl alcohol, isopropyl alcohol, butyl alcohol, pentyl alcohol, hexyl alcohol, heptyl alcohol, octyl alcohol, ethylene glycol, propylene glycol and higher liquid members of the group of aliphatic alcohols. preferably, the alkyl alcohol, glycol or mixture thereof is added to the composition in an amount no greater than that which is sufficient to maintain the components as a homogenous admixture. Generally, the alkyl alcohol, glycol or mixture thereof is used in an amount less than about 30% by volume based on the volume of the aqueous acid solution in order to avoid unnecessary dilution of the composition or interference with the performance of the composition.

One or more dispersing surfactants can be included in the inventive acidizing composition to facilitate dispersion of the corrosion inhibitor components in the aqueous acid solution. Due to their inert nature, nonionic surfactants are preferred. Examples of suitable nonionic surfactants include ethoxylated oleates, tall oils and ethoxylated fatty acids. Ethylene oxide adducts of octylphenol, nonylphenol, tridecylphenol and the like ethoxylated with from about 8 at about 20 moles of ethylene oxide per mole are preferred. Nonylphenol ethoxylated with about 8 to about 20 moles of ethylene oxide per mole is particularly suitable. Preferably, the dispersing surfactant or surfactants are added to the composition in an amount less than about 5% by volume based on the volume of the aqueous acid solution in order to avoid unnecessary dilution of the corrosion inhibiting composition or interference with the ingredients.

The inventive acidizing composition can be prepared in any suitable tank equipped with suitable mixing means as known to those skilled in the art. The composition may be transferred either at a controlled rate directly into the wellbore or into a convenient storage tank for injection down the wellbore.

The inventive method of treating a well (including the wellbore and/or one or more subterranean formations penetrated thereby) to increase the production of desired materials therefrom is generally carried out by pumping the inventive acidizing composition through tubular goods disposed in the wellbore and, if desired, into a subterranean formation to be treated. The intensified corrosion inhibitor of the composition inhibits corrosion of the ferrous based alloy surfaces of the tubular goods and other equipment contacted by the acidizing composition during the treatment.

The pumping rate and pressure utilized in carrying out the inventive method will depend upon the characteristics of the formation and whether or not fracturing of the formation is desired. After the inventive acidizing composition has been injected, the well may be shut in and allowed to stand for a period of several hours or more depending on the concentration and types of acid employed and the formation treated. If there is pressure on the well, the acidizing composition can be produced back for removal at the surface by releasing the pressure and allowing the composition to blow back into the wellbore and to the surface.

Thus, the present invention provides a hydrochloric acid-containing acidizing composition and method that utilizes an intensified inhibitor system for protecting ferrous based alloy surfaces from the corrosive effects of the acid. Such a system embodies many advantages. The corrosion inhibitor of the inventive acidizing composition diminishes the corrosive effects of the hydrochloric acid solution without decreasing the effectiveness of the solution in treating the well.

The effectiveness of the inventive acidizing composition including the intensified corrosion inhibitor thereof is not diminished by high temperature and pressure conditions such as can be encountered deep in subterranean formations.

The effectiveness of the intensified corrosion inhibitor is not diminished by increased strength of the acid in the aqueous acidic solution.

In order to further illustrate the compositions and methods of the present invention, the following examples are given.

EXAMPLE I

Tests were carried out to demonstrate the effectiveness of the corrosion inhibitor intensifier in protecting ferrous based alloys at elevated temperatures in the presence of hydrochloric acid solutions.

First, a sufficient quantity of concentrated hydrochloric acid was combined with water to form an aqueous acid solution containing 28% by weight of hydrochloric acid based on the total weight of the solution. The acidic solution then is divided into samples to which the corrosion inhibitor is added along with ingredients of the corrosion inhibitor intensifier of the present invention. The inhibitor used in the tests consisted of a mixture of solvents and dispersants with one or more quaternary ammonium compounds and Mannich condensation products, the mixture being sold by Halliburton Energy Services of Duncan, Oklahoma in association with the trade designation "HAI-95." The intensifier ingredients are identified in the table below.

A weighed sample coupon formed of N-80 grade steel was suspended in each sample. The samples were heated in pressure cells at 275° F. for about 4 hours while subjected to a pressure of about 600 psi. The corrosion loss experienced by each coupon then was determined by well known techniques.

The results of the tests are set forth below.

TABLE I

| Sample No. | Inhibitor Concentration, % by Volume | Formic Acid Concentration, % by Volume | Iodide ion Concentration Wt. KI/Mgal (lbs) | Corrosion Loss In lb/ft.$^2$ |
|---|---|---|---|---|
| 1 | 2 | 0 | 0 | 0.214 |
| 2 | 2 | 2 | 0 | 0.147 |
| 3 | 2 | 0 | 30 | 0.283 |
| 4 | 2 | 2 | 30 | 0.026 |
| 5 | 2 | 2 | 20 | 0.055 |
| 6 | 2 | 2 | 10 | 0.056 |
| 7 | 2 | 2 | 5 | 0.064 |
| 8 | 2 | 1 | 30 | 0.030 |
| 9 | 2 | 0.5 | 30 | 0.297 |
| 10 | 2 | 0.5 | 50 | 0.114 |
| 11 | 2 | 0.5 | 100 | 0.034 |

The results clearly demonstrate the synergistic effect achieved on corrosion inhibition when the corrosion inhibitor intensifier of the present invention is utilized.

EXAMPLE II

The test procedure set forth in Example I was repeated to determine the corrosion inhibitor intensifier effectiveness in protecting steel alloys such as 13 Cr Steel. The acid was 15% by weight hydrochloric, test duration was 6 hours and the temperature was 300° F. The results of the tests are set forth below.

TABLE II

| Sample No. | Inhibitor Concentration, % by Volume | Formic Acid Concentration, % by Volume | Iodide ion Concentration Wt KI/Mgal (lbs) | Corrosion Loss In lb/ft.$^2$ |
|---|---|---|---|---|
| 1 | 2 | 0 | 0 | 0.711 |
| 2 | 2 | 2 | 0 | 0.658 |
| 3 | 2 | 0 | 30 | 0.295 |
| 4 | 2 | 2 | 30 | 0.084 |

The results demonstrate the same synergistic effect to be present with the alloy steels.

Thus, the present invention is well adapted to carry out the objects and attain the ends and advantages mentioned as well as those which are inherent therein. The preceding examples can be repeated with similar success by substituting the generically or specifically described components and/or operating conditions of this invention for those used in the examples.

Furthermore, although certain preferred embodiments of the invention have been described for illustrative purposes, it will be appreciated that various modifications and innovations of the composition and method recited herein may be effected without departure from the basic principals which underlie the invention. Changes of this type are therefore deemed to lie within the spirit and scope of the invention except as may be necessarily limited by the appended claims and reasonable equivalents thereof.

What is claimed is:

1. A method of treating a subterranean formation penetrated by a wellbore comprising the steps of:

positioning within a well a ferrous alloy surface exposable to a treatment fluid, introducing into the well and contacting the surface with a treatment fluid comprising an aqueous acidic fluid primarily comprising an acid other than formic acid, a corrosion inhibitor comprising a quaternary ammonium compound and a corrosion inhibitor intensifier consisting essentially of an effective amount of a source of iodide ions and a source of formic acid; and contacting the formation with said aqueous acidic fluid, corrosion inhibitor and corrosion inhibitor intensifier.

2. The method of claim 1 wherein said source of iodide ions comprises at least one member selected from the group of sodium iodide, potassium iodide, copper iodide, and molecular iodine.

3. The method of claim 1 wherein said source of formic acid comprises at least one member selected from the group of aqueous formic acid, sodium formate, potassium formate, methylformate and ethylformate.

4. The method of claim 1 wherein said iodide ions are present in an amount of at least about 5 lbs per 1000 gallons of treating fluid and said formic acid is present in an amount of at least about 0.5 percent by volume of treatment fluid.

5. The method of claim 1 wherein said acidic fluid comprises a hydrochloric acid solution.

6. A method of inhibiting corrosion of a steel surface in contact with an acidic fluid comprising the steps of:

introducing into an acidic solution primarily comprising an acid other than formic acid containing a corrosion inhibitor comprising a quaternary ammonium compound an effective amount of a corrosion inhibitor intensifier consisting essentially of a source of iodide ions and a source of formic acid;

contacting a steel with said acidic solution with said inhibitor and intensifier whereby said intensifier enhances the effectiveness of said inhibitor over the effectiveness of said inhibitor or intensifier ingredient alone or in additive combination.

7. The method of claim 6 wherein said source of iodide ions comprises at least one member selected from the group of sodium iodide, potassium iodide, copper iodide, and molecular iodine.

8. The method of claim 6 wherein said source of formic acid comprises at least one member selected from the group of aqueous formic acid, sodium formate, potassium formate, methylformate and ethylformate.

9. The method of claim 6 wherein said iodide ions are present in an amount of at least about 5 lbs per 1000 gallons of treating fluid and said formic acid is present in an amount of at least about 0.5 percent by volume of treatment fluid.

10. The method of claim 6 wherein said acidic fluid comprises a hydrochloric acid solution.

11. In a fluid for treatment of a subterranean formation penetrated by a wellbore containing steel for enhancement of production from said formation by introduction of said fluid into said formation, the fluid comprising an acidic solution primarily comprising an acid other than formic acid and a corrosion inhibitor for protecting said steel comprising a quaternary ammonium compound, the improvement comprising an intensifier combination for introduction into the fluid and for enhancing the protection afforded by said corrosion inhibitor consisting essentially of an effective amount of a source of iodide ions and a source of formic acid.

12. The fluid of claim 11 wherein said source of iodide ions comprises at least one member selected from the group of sodium iodide, potassium iodide, copper iodide, and molecular iodine.

13. The fluid of claim 11 wherein said source of formic acid comprises at least one member selected from the group of aqueous formic acid, sodium formate, potassium formate, methylformate and ethylformate.

14. The fluid of claim 11 wherein said iodide ions are present in an amount of at least about 5 lbs per 1000 gallons of treating fluid and said formic acid is present in an amount of at least about 0.5 percent by volume of treatment fluid.

15. The fluid of claim 11 wherein said acidic solution comprises a hydrochloric acid solution.

* * * * *